United States Patent [19]

Hofbauer et al.

[11] 4,308,001
[45] Dec. 29, 1981

[54] HEAT PUMP COMPRESSOR INTEGRATED IN AN INTERNAL-COMBUSTION ENGINE

[75] Inventors: Peter Hofbauer; Helmut Leptien, both of Wolfsburg, Fed. Rep. of Germany

[73] Assignee: Volkswagenwerk Aktiengesellschaft, Wolfsburg, Fed. Rep. of Germany

[21] Appl. No.: 84,137

[22] Filed: Oct. 12, 1979

[30] Foreign Application Priority Data

Oct. 13, 1978 [DE] Fed. Rep. of Germany ....... 2844664

[51] Int. Cl.³ .................. F04B 35/00; F25B 27/00
[52] U.S. Cl. ........................... 417/364; 62/323.1; 277/88
[58] Field of Search ............ 417/364, 237, 380; 62/323 R; 123/70 R, 560; 277/3, 27, 88, 89, 93 R, 93 SD

[56] References Cited

U.S. PATENT DOCUMENTS

| | | |
|---|---|---|
| 2,103,862 | 12/1937 | Melcher ............................ 62/323 R |
| 2,181,851 | 11/1939 | Schlumbohm ..................... 62/323 R |
| 2,500,366 | 3/1950 | Lamberton ........................ 417/364 |
| 2,862,652 | 12/1958 | Hoiby et al. ...................... 62/323 R |
| 4,114,904 | 9/1978 | Wentworth, Jr. ..................... 277/88 |

FOREIGN PATENT DOCUMENTS 2026107 1/1980 United Kingdom ................ 417/364

*Primary Examiner*—Leonard E. Smith
*Attorney, Agent, or Firm*—Spencer & Kaye

[57] ABSTRACT

An internal-combustion engine and a compressor driven by the engine are combined into an integrated structural unit by providing that some of the cylinders of a cylinder block are engine cylinders while some of the cylinders of the same cylinder block are compressor cylinders. Between the engine cylinder group and the compressor cylinder group there is provided a space for receiving a slide ring seal which is mounted on a common crankshaft and which extends between and sealingly engages a collar face rotating with the crankshaft as a unit and a bearing block supporting the crankshaft.

10 Claims, 1 Drawing Figure

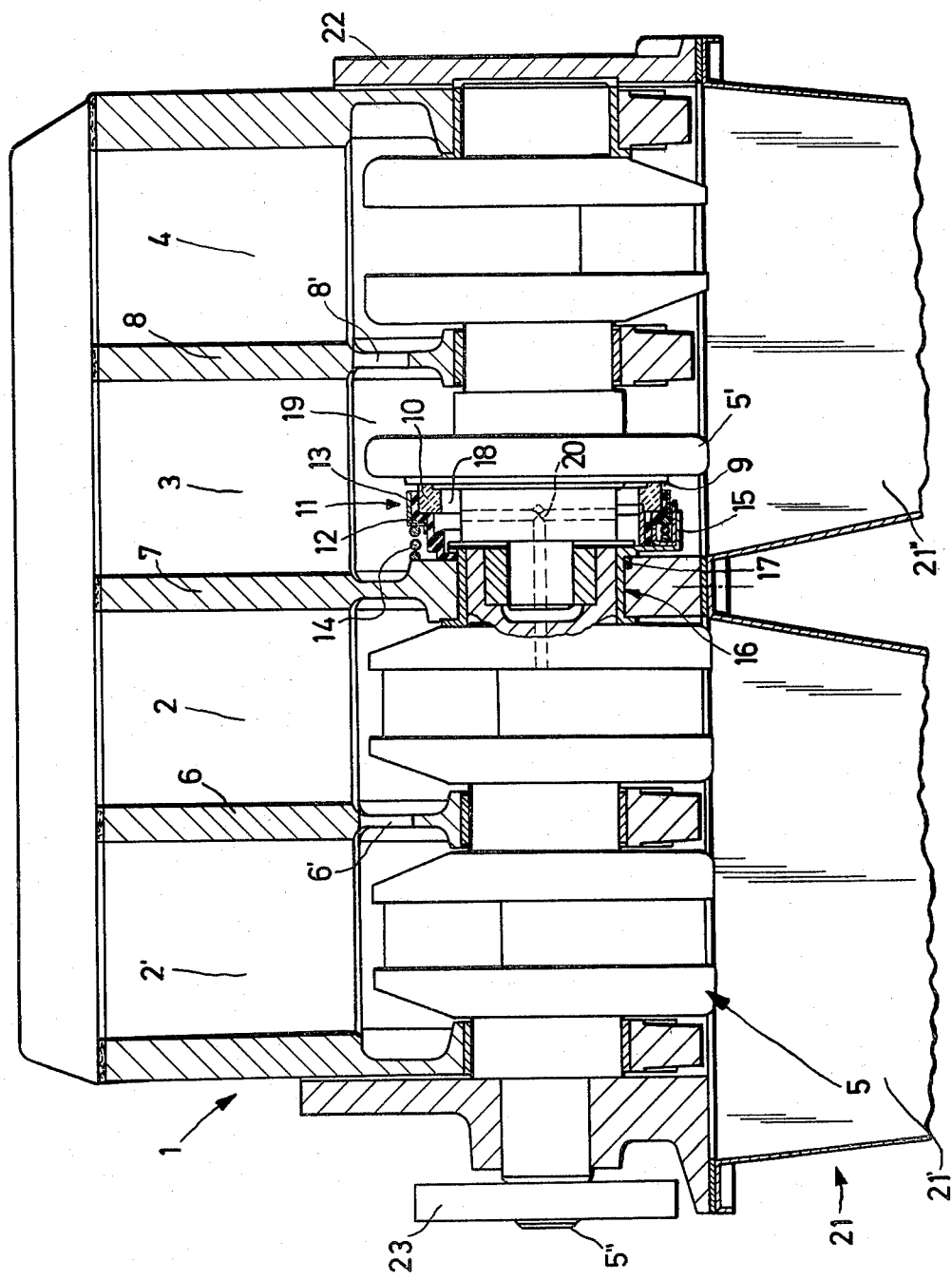

HEAT PUMP COMPRESSOR INTEGRATED IN AN INTERNAL-COMBUSTION ENGINE

BACKGROUND OF THE INVENTION

This invention relates to a heat pump which includes a compressor driven by an internal-combustion engine.

In known heat pumps which are associated with an internal-combustion engine and which are used, for example, in heating systems for buildings and which include heat exchangers as well as a control system, the internal-combustion engine and the compressor form two separate units which are flanged together in a relatively complex manner. The reasons therefor may be found in the sealing problems which are difficult to solve, since the coolant (such as freon) contained in the compressor must be, under all circumstances, prevented from entering into the chambers of the internal-combustion engine. If, for example, the coolant penetrates into the engine crankcase, it will be drawn-in and combusted by the engine, resulting in the generation of toxic gases.

SUMMARY OF THE INVENTION

It is an object of the present invention to provide an improved heat pump of the above-outlined type which is structurally simpler than the known arrangements and is consequently smaller and lighter in weight and consumes less fuel.

This object and others to become apparent as the specification progresses, are achieved by the invention, according to which, briefly stated, the compressor of the heat pump and the engine are combined into an integrated structural unit by providing that some of the cylinders of a cylinder block are engine cylinders while some of the cylinders of the same cylinder block are compressor cylinders. Between the engine cylinder group and the compressor cylinder group there is provided a space for receiving a slide ring seal which is mounted on a common crankshaft and which extends between and sealingly engages a collar face rotating with the crankshaft as a unit and a bearing block supporting the crankshaft.

Thus, in the present invention, the compressor and the internal-combustion engine which drives the compressor form an integrated unit without mutually impeding the structural possibilities for either the compressor or the engine. The invention subdivides the common cylinder block—and thus also a common crankshaft and a common crankcase—into a zone associated with the engine and a zone associated with the compressor and provides a space between the two groups of cylinders. Such a space in which the slide ring seal is accommodated, may be provided by a pistonless cylinder. Thus, for providing this space, no particular structural measures need to be taken in the design of the cylinder block.

The slide ring seal together with the collar face of the crankshaft defines, in the above-discussed space, an inner chamber and an outer chamber which, by sealing the space with respect to the engine-side part of the crankcase can be utilized to generate a pressure difference which assures close contact of the sealing ring of the slide ring seal with the collar face. According to a further feature of the invention, such a pressure difference is generated by maintaining a space within the slide ring seal in communication with the engine-side of a common crankcase and by maintaining a space externally of the slide ring seal in communication with the compressor-side of the common crankcase.

It is noted in this connection that when the heat pump is at a standstill, the pressure in the coolant circulation system is equalized and a relatively high pressure, for example, 4 bar, is developed in the compressor-side part of the crankcase. This relatively high pressure presses the sealing ring of the slide ring seal particularly tightly against the collar face of the crankshaft. During operation of the heat pump, the crankcase on the compressor side can easily be evacuated in order to reduce friction losses between the slide ring and the collar face.

The above-discussed sealing effect is further enhanced according to a further feature of the invention, wherein a fly-disc is arranged on the engine-side of the crankshaft and the compressor-side terminus of the crankshaft is situated within the crankcase. The arrangement of a fly-disc on the engine-side part of the crankshaft—outside of the belt drive for the internal-combustion engine—permits the compressor-side part of the crankcase to be sealed hermetically; in such a case the compressor-side part of the crankshaft need not project out of the crankcase.

BRIEF DESCRIPTION OF THE DRAWING

The sole FIGURE is a longitudinal sectional view of a preferred embodiment of the invention.

DESCRIPTION OF THE PREFERRED EMBODIMENT

Turning now to the FIGURE, in a cylinder block 1 of an internal-combustion engine there are shown four cylinders 2, 2', 3 and 4. The cylinders 2 and 2' are components of the internal-combustion engine, the cylinder 4 is a component of a compressor of a heat pump, while the cylinder 3 situated between the cylinders 2 and 4 is pistonless. The pistons in cylinders 2, 2' and 4 as well as the associated piston rods connected to the crankshaft are not shown in the drawing; they are of conventional design and do not form part of the present invention.

A common crankshaft 5 is positioned in bearing blocks which extend between the individual cylinder zones. Of the bearing blocks only those designated at 6, 7 and 8 are of interest in connection with the present invention.

In the zone of the "neutral" cylinder 3, the crankshaft 5 carries a disc 5' which has a collar face 9 to engage a sealing ring 10 of a slide ring seal generally designated at 11. The latter also includes a sealing sleeve 12 which is connected with the sealing ring 10 by means of an annulus 13 as well as a compression spring 14 which is supported at the collar 15 of a collar bearing 16. Thus, the spring 14 presses the sealing ring 10 against the collar face 9 of the disc 5'. An O-ring 17 is associated with the collar bearing 16 to seal any gap that may exist between the bearing block 7 and the collar bearing 16. Such a sealing function, however, can also be performed by the sealing sleeve 12, provided that the free end of the sealing sleeve is properly biased.

The slide ring seal, clamped-in as discussed above, defines, together with the disc 5', two mutually sealed chambers 18 and 19. The sealing sleeve 12 has a stepped configuration and thus has, axially adjacent the sealing ring 10, an outer diameter which is less than the outer diameter of the sealing ring 10. In this manner the sealing sleeve 12 obtains a generally radial shoulder face which is exposed to the pressure prevailing in the chamber 19. Consequently, by providing the sealing sleeve shoulder, there is derived from the pressure prevailing in the chamber 19, an axial force which tends to press the sealing ring 10 against the collar face 9. The force with which the sealing ring 10 is pressed against the collar face 9 and consequently the sealing effect are determined by the pressure difference between the two chambers 18 and 19. This is utilized for increasing the sealing effect, by maintaining communication between the inner chamber 18 and the engine-side part of the crankcase at least by means of a port 20, while the pressure in the outer chamber 19 is determined by the pressure in the compressor-side part of the crankcase. Accordingly, a lower pressure prevails in the inner chamber 18 than in the outer chamber 19.

Although for reasons of installation, the crankshaft 5 is a two-part component, the end result is nevertheless a common crankshaft for the internal-combustion engine and for the compressor within the confines of a common cylinder block. It is to be understood that the cylinder head will also be a common component for such a unit.

A fly-disc 23 is disposed outside the crankcase on the engine side on the crankshaft end 5" so that the compressor-side part of the crankcase can be sealed hermetically at 22 without requiring a passage for the crankshaft. The oil pan 21 is formed of two parts 21' and 21" which are sealingly drawn over the bearing block 7. The oil pan parts, on the other hand, permit pressure equalization between the crankcase zones they cover. To assist in achieving such an equalization, the bearing blocks 6 and 8 may be provided with passages 6' and 8'.

It is to be understood that the present invention may find advantageous application in rotary engines as well.

It will be understood that the above description of the present invention is susceptible to various modifications, changes and adaptations, and the same are intended to be comprehended within the meaning and range of equivalents of the appended claims.

What is claimed is:

1. In a heat pump including a compressor driven by an internal-combustion engine, the improvement wherein said engine and said compressor are integrated into a structural unit; said unit comprising
    (a) a cylinder block common to said engine and said compressor;
    (b) a plurality of cylinders in said cylinder block; some of said cylinders forming a first cylinder group consisting of engine cylinders and some of said cylinders forming a second cylinder group consisting of compressor cylinders; said first cylinder group forming an engine side and said second cylinder group forming a compressor side of said structural unit; one cylinder being pistonless and being situated between said first and second cylinder groups;
    (c) a space defined in said cylinder block between said first and second cylinder groups; the zone of the pistonless cylinder constituting said space;
    (d) a plurality of bearing blocks in said cylinder block; said bearing blocks extending in a series in said engine side and said compressor side;
    (e) a crankshaft supported by said bearing blocks and being common to said first and second cylinder groups;
    (f) a collar face situated in said space and arranged on said crankshaft for rotation therewith; and
    (g) a slide ring seal situated in said space and mounted on said crankshaft; said slide ring seal extending from said collar face to one of said bearing blocks on said engine side; said slide ring seal being in a sealing relationship with said collar face and said one of said bearing blocks.

2. A heat pump as defined in claim 1, wherein said slide ring seal is affixed to said one of said bearing blocks and slidingly engages said collar face.

3. In a heat pump including a compressor driven by an internal-combustion engine, the improvement wherein said engine and said compressor are integrated into a structural unit; said unit comprising
    (a) a cylinder block common to said engine and said compressor;
    (b) a plurality of cylinders in said cylinder block; some of said cylinders forming a first cylinder group consisting of engine cylinders and some of said cylinders forming a second cylinder group consisting of compressor cylinders; said first cylinder group forming an engine side and said second cylinder group forming a compressor side of said structural unit;
    (c) a space defined in said cylinder block between said first and second cylinder groups;
    (d) a plurality of bearing blocks in said cylinder block; said bearing blocks extending in a series in said engine side and said compressor side;
    (e) a crankshaft supported by said bearing blocks and being common to said first and second cylinder groups;
    (f) a collar face situated in said space and arranged on said crankshaft for rotation therewith; and
    (g) a slide ring seal situated in said space and mounted on said crankshaft; said slide ring seal extending from said collar face to one of said bearing blocks on said engine side; said slide ring seal being in a sealing, sliding engagement with said collar face and being sealingly affixed to said one of said bearing blocks; said slide ring seal surrounding and defining a chamber; said slide ring seal comprising
        (1) a sealing ring surrounding said crankshaft and slidingly engaging said collar face; and
        (2) a sleeve surrounding said crankshaft and affixed, at opposite ends, to said one of said bearing blocks and said sealing ring, respectively; said sleeve having, at a location axially adjacent said sealing ring, an outer diameter smaller than that of said sealing ring; and
    (h) means for maintaining a lower pressure in said chamber than externally of said slide ring seal, whereby said sealing ring being pressed against said collar face by a force dependent upon the difference between the pressures outside and inside said chamber.

4. A heat pump as defined in claim 3, further comprising a crankcase affixed to said cylinder block and being common to said engine and said compressor; said crankcase having an engine-side part and a compressor-side part; means defining an additional chamber situated in said space externally of said slide ring seal; means maintaining communication between said chamber defined by said slide ring seal and said engine-side part of said crankcase; and means maintaining communication between said additional chamber and said compressor-side part of said crankcase.

5. A heat pump as defined in claim 3, wherein said sleeve has a portion clamped by said collar, and further wherein said circumferential sealing means is formed by the clamped-in portion of said sleeve.

6. In a heat pump including a compressor driven by an internal-combustion engine, the improvement wherein said engine and said compressor are integrated into a structural unit; said unit comprising
  (a) a cylinder block common to said engine and said compressor;
  (b) a plurality of cylinders in said cylinder block; some of said cylinders forming a first cylinder group consisting of engine cylinders and some of said cylinders forming a second cylinder group consisting of compressor cylinders; said first cylinder group forming an engine side and said second cylinder group forming a compressor side of said structural unit;
  (c) a space defined in said cylinder block between said first and second cylinder groups;
  (d) a plurality of bearing blocks in said cylinder block; said bearing blocks extending in a series in said engine side and said compressor side;
  (e) a crankshaft supported by said bearing blocks and being common to said first and second cylinder groups;
  (f) a collar face situated in said space and arranged on said crankshaft for rotation therewith; and
  (g) a slide ring seal situated in said space and mounted on said crankshaft; said slide ring seal extending from said collar face to one of said bearing blocks on said engine side; said slide ring seal being in a sealing, sliding engagement with said collar face and being sealingly affixed to said one of said bearing blocks; said slide ring seal including a sleeve surrounding said crankshaft;
  (h) a closed collar bearing mounted in said one of said bearing blocks and having a collar oriented toward said compressor side; said sleeve being sealingly affixed to said collar; and
  (i) a circumferential sealing means arranged in said one of said bearing blocks and cooperating with said collar.

7. A heat pump as defined in claim 3 or 6, further wherein one of said cylinders is pistonless and is situated between said first and second cylinder groups; the zone of the pistonless cylinder constituting said space.

8. A heat pump as defined in claim 3 or 6 or 1, further comprising a common cylinder head secured to said cylinder block.

9. A heat pump as defined in claim 3 or 6 or 1, further comprising a disc mounted on said crankshaft in said space; said disc having a surface constituting said collar face.

10. A heat pump as defined in claim 3 or 6 or 1, further comprising a crankcase affixed to said cylinder block and being common to said engine and said compressor; and a fly-disc mounted on said crankshaft at said engine side; said crankshaft having an end at said compressor side; said end being situated within the confines of said crankcase.

* * * * *